United States Patent [19]

Jones et al.

[11] Patent Number: 4,831,509
[45] Date of Patent: May 16, 1989

[54] DOOR OPERATION CONTROL APPARATUS

[75] Inventors: Richard E. Jones, Carlingford; Richard W. Aubert, Victoria, both of Australia

[73] Assignee: Byrne & Davidson Doors (N.S.W.)PTY. Limited, Revesby, Australia

[21] Appl. No.: 4,998

[22] Filed: Jan. 20, 1987

[30] Foreign Application Priority Data

Apr. 16, 1986 [AU] Australia .............................. PH5499

[51] Int. Cl.$^4$ ...................... G06F 15/20; E05F 15/10; H02P 1/04
[52] U.S. Cl. ................................. 364/167.01; 49/28; 49/25; 318/266; 318/466; 340/539; 340/825.72; 364/178; 364/400
[58] Field of Search ............... 364/167, 148, 178, 179, 364/513, 400; 318/266, 281, 282, 286, 469, 16, 466, 467, 468, 636; 49/28, 26, 139, 25, 31; 340/696, 825.72, 825.69, 539, 534

[56] References Cited

U.S. PATENT DOCUMENTS

| | | | |
|---|---|---|---|
| 3,891,909 | 6/1975 | Newson | 318/469 |
| 4,206,390 | 6/1980 | Jessup | 318/469 |
| 4,247,806 | 1/1981 | Mercier | 318/469 X |
| 4,328,540 | 5/1982 | Matsuoka et al. | 364/167 |
| 4,365,250 | 12/1982 | Matsuoka et al. | 364/266 X |
| 4,386,398 | 5/1983 | Matsuoka et al. | 364/167 |
| 4,475,069 | 10/1984 | Tadokoro et al. | 318/266 X |
| 4,498,033 | 2/1985 | Aihara et al. | 318/266 X |
| 4,638,433 | 1/1987 | Schindler | 318/266 X |

*Primary Examiner*—Joseph Ruggiero
*Attorney, Agent, or Firm*—Pennie & Edmonds

[57] ABSTRACT

A door controller for roller type doors is disclosed incorporating a microprocessor control system. The microprocessor measures and stores the door speed over segments of the door travel to generate a door speed travel characteristic. This characteristic enables the door controller to accurately assess obstruction conditions by comparing a real time characteristic with a stored characteristic. The microprocessor also stores electronically the upper and lower limits of door travel. The microprocessor monitors electric motor duty cycle to avoid overheating of the motor and possible burnout while also controlling locking of the drive mechanism when the motor is inoperative. The microprocessor is also used to set the radio control signal code used to activate the door drive mechanism, the setting procedure allows for immediate verification of the set code.

16 Claims, 10 Drawing Sheets

DOOR OPERATION CONTROL APPARATUS

BACKGROUND OF THE INVENTION

The present invention relates to an improved door controller for roller type doors.

Such doors are well known and comprise a flexible door curtain which can be raised and lowered from a drum located above the door aperture. It is also well known to employ a pair of end drums rotatably mounted on a fixed axle extending horizontally across the top of the door aperture. The curtain is secured at its upper end to each of the spaced end drums and a ring gear is secured to one drum and provided with a motor drive for rotating the drums and thereby raising or lowering the door.

Door controllers of the type having a remote control transmitter which sends a coded signal to a controller coupled to the door drive means for controlling raising and lowering the door are also well known. These controllers usually operate in conjunction with mechanically operated upper and lower limit switches and obstruction detection devices. The forms of obstruction detection are many and include mechanical sensors in the lower portion of the door curtain, motor load monitoring devices, and run time monitors.

Each of these systems has inherent disadvantages and particular problems have been found with the type of door described above where the downward movement of the door is dependent upon the weight of the door curtain causing the door curtain to fall into the door opening. In such doors the changes in motor load will be dependent on the position of the door. Furthermore, the relationship between motor load and door position will vary with door age, climatic conditions and track condition. Thus setting of load monitoring device to only detect actual obstructions is difficult as each of these variations must be compensated for in order to avoid false tripping of the door mechanism.

SUMMARY OF THE INVENTION

The present invention seeks to overcome or at least ameliorate these problems by providing an improved door controller which can "learn" the characteristics of a particular door.

According to a first aspect, the present invention provides a door controller including:

a mechanism for driving a door curtain between open and closed positions in response to received door operation command signals, door position encoder for providing signals indicative of the position of the door curtain relative to the door opening;

timing mechanism for providing timing signals for said controller;

processing mechanism responsive to said encoder and said timing mechanism for producing a representation of a door travel speed characteristic;

memory device coupled to said processing mechanism for storing said representation of a door travel speed characteristic.

According to a second aspect, the present invention provides a door controller according to said first aspect wherein said processing mechanism is adapted to compare the door travel speed characteristic for each run of the door with the previously stored characteristic and being responsive to the difference in said characteristics exceeding a predetermined margin to indicate an obstruction condition.

Preferably, said mechanism for driving the door curtain is further responsive to detection of an obstruction condition to reverse the direction of travel of the door curtain for a predetermined period and then stop travel of said door curtain.

According to a third aspect, the present invention provides a door controller including:

a mechanism for driving a door curtain between open and close position in response to received door operation command signals, door position encoder for providing signals indicative of the door curtain relative to the door opening, first memory device coupled to said door position encoder for storing signals representative of a desired closed position of the door curtain, second memory device coupled to said door position encoder for storing signals representative of a desired open position of said door curtain, said mechanism for driving the door curtain being responsive to said signals stored in said first and second memory devices to limit door curtain travel to between these stored positions.

BRIEF DESCRIPTION OF THE DRAWINGS

Embodiments of the invention will now be described by way of example only with reference to the accompanying drawings in which.

DESCRIPTION OF THE ILLUSTRATED EMBODIMENTS

The door controller according to the embodiments of the invention provides several different features which will be described separately hereunder. These can be summarized as follows:

(1) Door Characteristic Learning
(2) Reversing and Obstruction Detection
(3) Limit Setting
(4) Warm Start Function
(5) Code Setting and Decoding
(6) Motor Protection
(7) Door Locking

Door Characteristic Learning

In order to understand the characteristic learning function of the door controller the general concept of achieving such a function will first be described followed by one preferred implementation of this concept.

The door curtain position relative to the door opening is obtained from an encoder coupled to the door drum. Pulses are provided to the encoder from optoelectronic sensors appropriately placed or positioned in relation to a set of spinning blades coupled to the drive means for the roller door. In this way the encoder can produce signals indicative of the position of the door curtain. For preference, at least two optoelectronic sensors are used so as to enable the direction of door travel to be sensed.

In order to determine a door travel characteristic the processing means samples the time taken for the door curtain to travel a fixed distance and therefrom determines changes in the speed of the door. Preferably this is done by notionally dividing the door travel into a plurality of segments and further sub-dividing each segment into a plurality of sectos and producing a running average of peak speed changes for each sector and storing this average for each segment of the door travel. This running average of peak speed changes for each segment is used to represent the door travel speed characteristic.

The running average is regularly updated with each run of the door unless the value of peak speed change is outside predetermined limits indicating an error in the system or detection of an obstruction. Thus over a period of time the processing means learns a door travel speed characteristic for the particular door being controlled.

Figure 1:
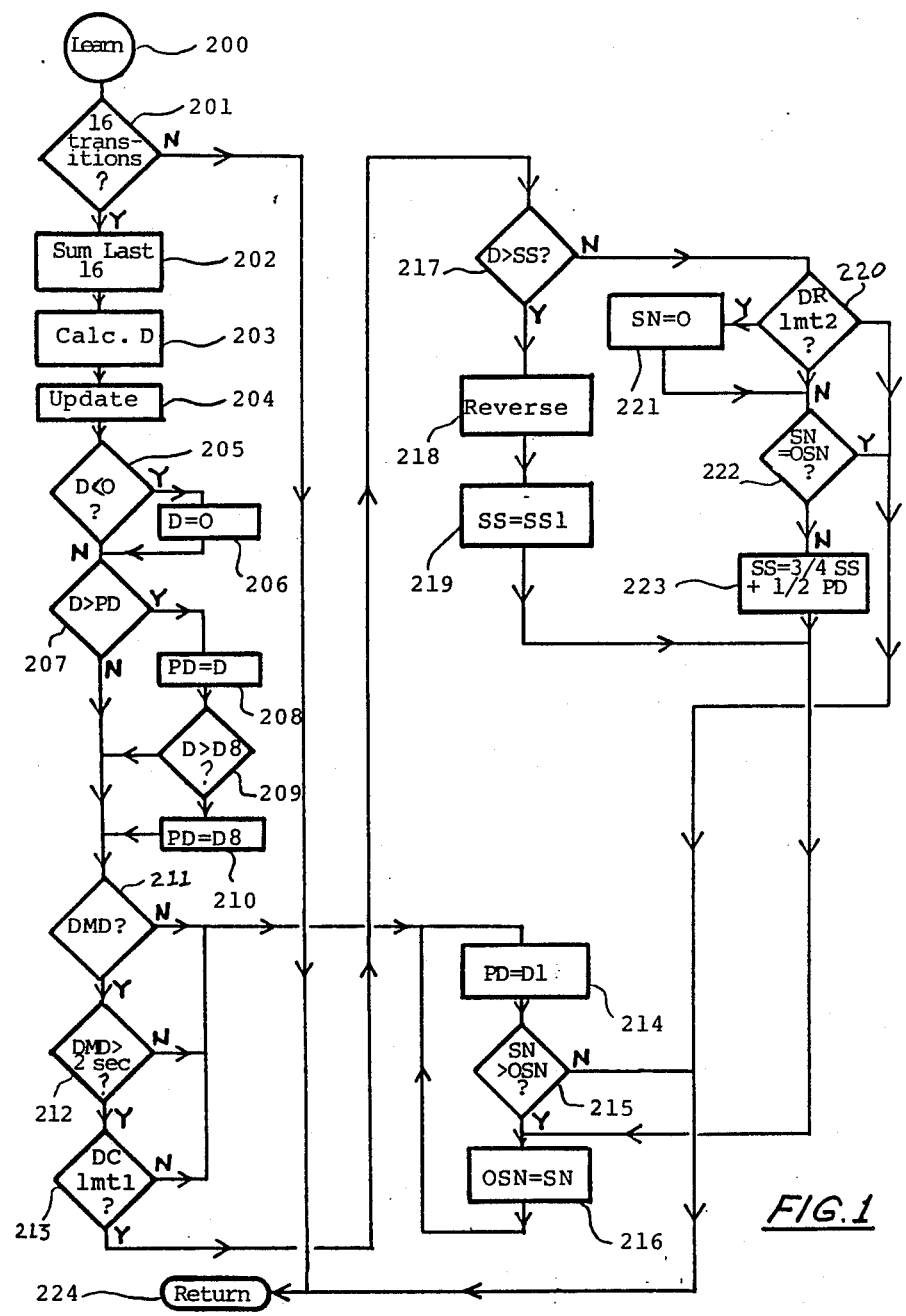
FIG. 1 shows a flow chart of the processor operations used to control the door characteristic function and reversing function of the door controller according to the invention.

Referring to FIG. 1 a particular example of a program implementation of the door travel characteristic learning function will be described.

In order to determine the time taken for the door to travel a fixed distance the processor determines whether a fixed number of encoder transitions have occurred, in this example sixteen, if they have not, the subroutine returns to main program and awaits the next test. When the number of transitions have occurred, that is the door has travelled a predetermined distance, the processor calculates the time period to travel this distance by summing the last sixteen encoder periods.

This time summation is then compared with a previously stored time sum for the particular sector of interest. This comparison takes the form of subtracting the old time summation from tee newly calculated time sum. If the difference is negative, that is the new value is less than the old value, the difference value is set to zero. If the difference is positive or zero the program drops through to the next test.

The next test compares the newly calculated difference value for the particular sector with a previously stored peak difference value. If the new difference value is greater than the old peak difference value, it replaces the old value and is stored. The new difference value is then compared with a value representing an 8% speed change. This value represents the upper limit of speed change considered acceptable, any higher value is considered an error or obstruction. If the new difference is above the 8% speed change value, it is replaced by this upper limit value.

The processor next tests whether the values of peak difference are suitable for updating the sector sensitivity characteristic. This is done by testing whether the door curtain is travelling downward, and has been for more than a predetermined period, in this example 2 seconds. If either of these tests is not satisfied, the peak difference value is reinitialized to a value representing a 1% speed change. If the door movement satisfies these two conditions a further test is made to determine whether the door curtain is approaching its lower limit, in this example within 25 mm of its lower limit. If the door curtain is not close to its lower limit the subroutine considers the value of peak difference for a particular sector to be suitable for further processing. If the door is close to its lower limit the peak difference value is again reinitialized to a 1% speed change value.

Once reinitialization has taken place the processor tests whether the sector number presently being reinitialized is greater than the previously stored sector number, if it is not, the subroutine is exited. If it is greater, then the old sector number is replaced by the present sector number and the program loops back to reinitialize the value of the peak difference.

If further processing of the peak difference value is indicated by the above tests the subroutine compares the new difference value with a previously stored sector sensitivity value. If the new difference value is greater than the stored sector sensitivity value, this indicates the detection of an obstruction and the subroutine steps in relation to this result will be described later. If the new difference value is not greater than the previously stored sector sensitivity value, the door position is tested to determine whether it is close to its lower limit. If it is within 50 mm of the lower limit the sector number is set to a value of zero and the value of sector number is then compared with the old stored sector number. If the sector sensitivity value has already been updated, that is the present sector number equals the old stored sector number, then the subroutine is again exited.

If the sector sensitivity is to be updated, a running average technique is used, in this particular embodiment, the new sector sensitivity is set to 75% of the old sensitivity value plus half the new peak difference value. The old stored sector number is then replaced with the present sector number and the peak difference value is reinitialized before the subroutine is exited.

Reversing and Obstruction Detection

As stated above the stored running average of peak speed changes for a segment is regularly compared with the calculated peak speed change for the same segment on a present run of the door. If this new value exceeds the stored value, the door controller will consider an obstruction to have been detected in the travel path of the door. The detection of an obstruction will preferably cause the door to stop and reverse away from the obstruction. This can be done preferably for either direction of travel of the door. When an obstruction condition occurs the value of the running average for the particular segment is not updated to the value detected but is modified by a predetermined margin which serves to desensitize the door in order to minimize the occurrence of false obstruction detection conditions. This margin would preferably be of the order of 1%. In contrast if no obstruction detection conditions occur over a period of time the door will gradually reach maximum sensitivity for a particular door travel characteristic.

The learning of the door travel characteristic and the regular updating of this characteristic enables the door controller to make an accurate assessment of the correct operation of the door, and appropriate action to be taken should this operation deviate from the characteristic learned by the controller.

Limit Setting

As the door controller is provided with information from the door position encoder, in order to ensure correct operation of the door this position information must in some way be referred to door curtain position in relation to the door opening. This requires setting the limits of the door travel within the opening.

In the past this has been done by providing detectors at the lowermost limit of door travel, usually ground level, and at the uppermost limit of door travel, usually near the top of the door opening. This has in most cases required accurate manual adjustment by the installer of the door limit detectors.

The embodiments of the present invention overcome the need for adjustment of such detectors and also do away with the need for separate limit detectors by enabling the limits of door travel to be set within the memory of the door controller.

The limit setting function is performed as follows. The door curtain is driven down into the floor or lower limit of the door opening by activation of a first switch until an overload condition is detected and the motor cut-out activated. A second switch is then operated to cause the lower limit to be stored in a memory register of the controller. In the case where an overload condition has been detected a number or count representing the lower limit setting is reduced by several counts so that the lower limit is a predetermined distance above the overload condition point.

An alternative form of lower limit setting can be also performed by manually moving the door to a desired lower limit point and operating the second switch to store the limit setting in a memory register. In this case the count representing the lower limit is not altered as no overload condition has occurred.

Once the lower limit has been set the first switch is again operated and causes the door curtain to travel upward until the door curtain reaches the upper door stops and an overload condition is again detected and the motor de-activated. A similar procedure is then followed to set the upper limit. Manual adjustment of the door is again possible if an overload condition has not been caused.

In normal operation a door position counter holding a count representative of the door curtain position is regularly compared with the limit setting counts stored in the appropriate memory registers. When an equality with either stored count is detected the door curtain will be considered to have reached the upper or lower limit of travel and the drive motor will be stopped.

A particular example of a processor subroutine for performing the limit set function will now be described.

The subroutine begins by testing whether the power limit button has been pressed. If the button is pressed the motor is activated and drives down towards the lower limit or floor. The subroutine then tests for the period of time the motor has been running. If this period is below a predetermined value, in this example 25 seconds, the program loops back to the start of the subroutine. If the predetermined time value is exceeded the subroutine tests for a motor overload. If a motor overload is detected the door position register is initialized, thus setting the lower limit. The motor is then turned off and depression of the limit set button is tested for, if the button is depressed the subroutine loops back and waits for release of the button before proceeding to the next test which tests for release of the power limit button.

Once the power limit button is released the subroutine proceeds to the upper limit setting program. The state of the power limit button is again tested and if it is depressed the motor is activated in an upward direction and its running time is monitored and the program loops back continually to test for depression of the power limit button until the running time exceeds a predetermined value, in this example two seconds. Once this value is exceeded a motor overload is tested for with similar program to that used for lower limit setting until an overload occurs. When this condition is satisfied the door position is tested. If the door is not a predetermined distance above the lower limit when an overload occurs, in this example 500 mm, the program returns to the beginning of the limit setting procedure. If the door is above the predetermined distance, the door size register is set, the motor is deactivated and the upper limit setting completed, followed by return by the subroutine to the main program.

If the power limit button is not depressed once the upper limit setting program is entered, the motor is deactivated and the state of the limit set button is tested. When the limit set button is detected as being depressed and the door is a predetermined distance above the lower limit, the door register size is set allowing for door overrun and the motor is deactivated and the subroutine exited.

Warm Start Function

The warm start function relates to the requirement to reset door operation parameters following an unexpected event such as a power failure. The door controller is preferably provided with emergency power in the form of battery backup. In the event of power failure the door controller will lose track of the door curtain position relative to the door opening.

The controller overcomes this problem by providing automatic seeking of the lower door travel limit once power is restored and at the next activation of the door by an operator. On initial operation of the door following a power failure the door curtain preferably goes up a short distance and then drives down to the floor and stops. The initial upward movement of the door curtain is to allow the door to reach normal running speed when driving into the floor and thus provide a consistent lower limit setting irrespective of where the door curtain stops during a power interruption.

The controller detects a speed fall below a predetermined limit as the lower floor limit and resets the counter holding the door position counts. Preferably a visual indicator, for example an LED, is used to tell the operator that a power interruption or fault has occurred and this indicator will go out once the door position counter has been reinitialized by the door controller.

Figure 4:
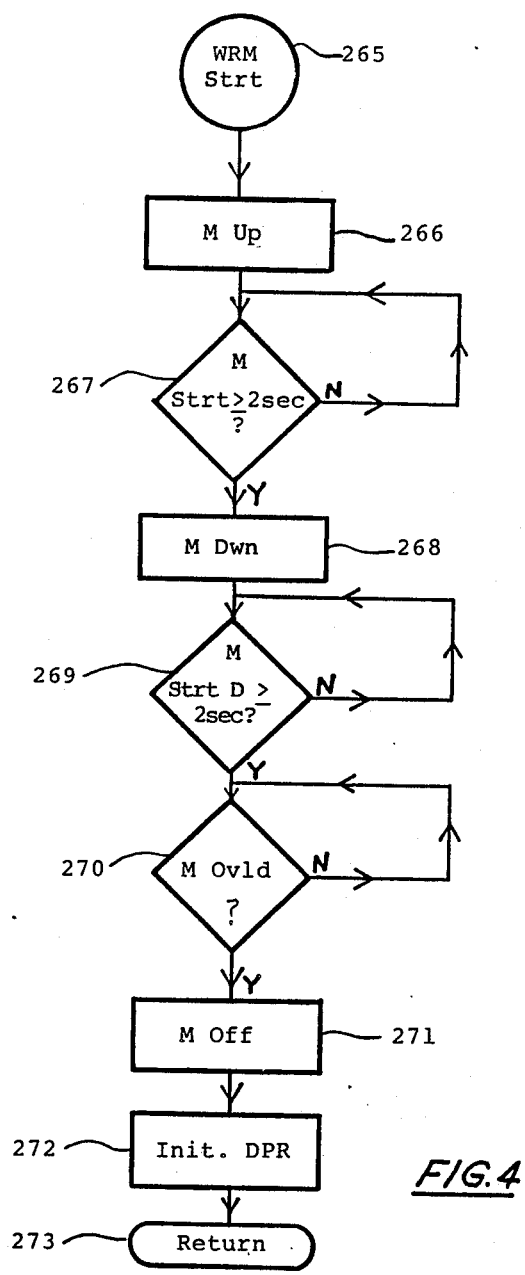
FIG. 4 shows a flow chart of the program subroutine for the warm start function of the door controller according to the invention.

A specific example of the warm start function is shown in the flow chart of FIG. 4.

The subroutine begins by activating the motor to drive upwards and testing for a predetermined time elapsed interval, in this particular example, two seconds. When this time interval has elapsed the motor is reversed and drives the door downwards. After a predetermined time period, again in this example, two seconds, the subroutine tests for a motor overload. That is, it tests for the door curtain reaching floor level.

Once an overload is detected, the motor is deactivated and the door position register is reinitialized to the lower limit value. The subroutine then returns to the main control program.

Code Setting and Decoding

The processor performs several functions when setting the codes used for radio-controlled activation of the door motor. The processor is required to decode incoming signals, filter out unwanted signals, set the code if necessary and verify the code setting. These functions are performed by two related subroutines which will be described below.

Figure 5:
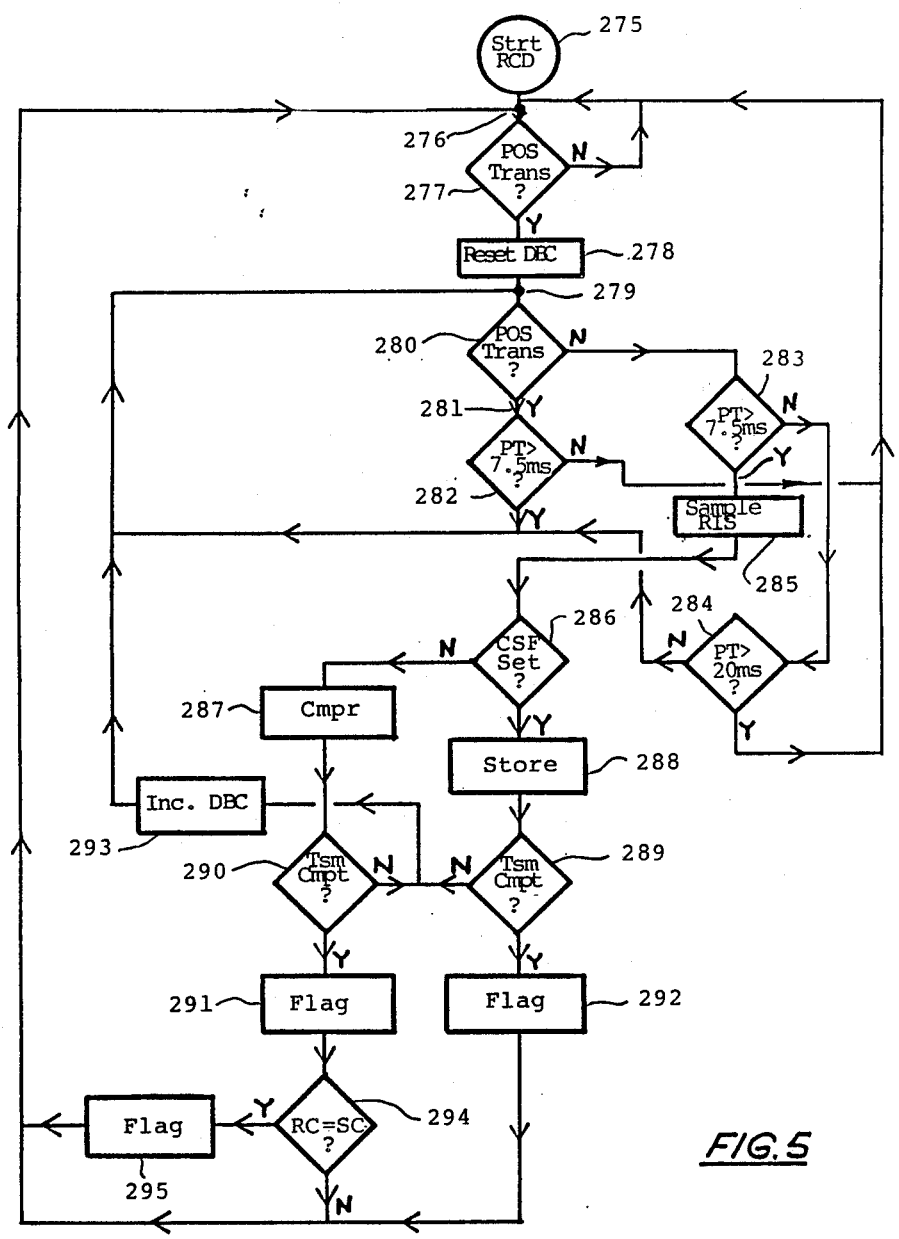
FIG. 5 shows a flow chart of the program subroutine for the radio control input decoding function of the door controller according to the invention.

Referring to FIG. 5 the radio control decoding subroutine is shown. The subroutine begins with a testing loop which continually tests for a positive transition of the radio control input. When a positive transition is detected a data bit counter is reset to enable the subroutine to count the number of data bits detected and thus determine when transmission has been completed.

Once the counter has been reset the subroutine again tests for a positive transition on the radio control input. If no transition has occurred and a predetermined period has elapsed since the last detected positive transition, the processor samples the state of the radio control input. It then tests a register within the processor to determine whether a code setting flag has been set. This flag controls the code setting operation, if it is not set the subroutine proceeds to the normal decoding operation. This comprises comparing each bit of the input code with the stored code, testing to determine whether the code transmission is complete, setting a flag if it is and then determining whether the whole received code is equivalent to the stored code. If the codes are equivalent a "code valid" flag is set and the subroutine loops back to await the start of the next transmission. If the codes are not equivalent the subroutine ignores the transmission and returns to await the next code transmission.

If the codes setting flag is set, the processor stores the current remote control input state in a code storage register and then tests for end of code transmission. If the transmission is completed, a flag is set and the subroutine returns to await the start of the next transmission.

If the tests for end of transmission are negative the subroutine increments the data bit counter and loops back to test for a positive transition on the radio control input.

Figure 6:
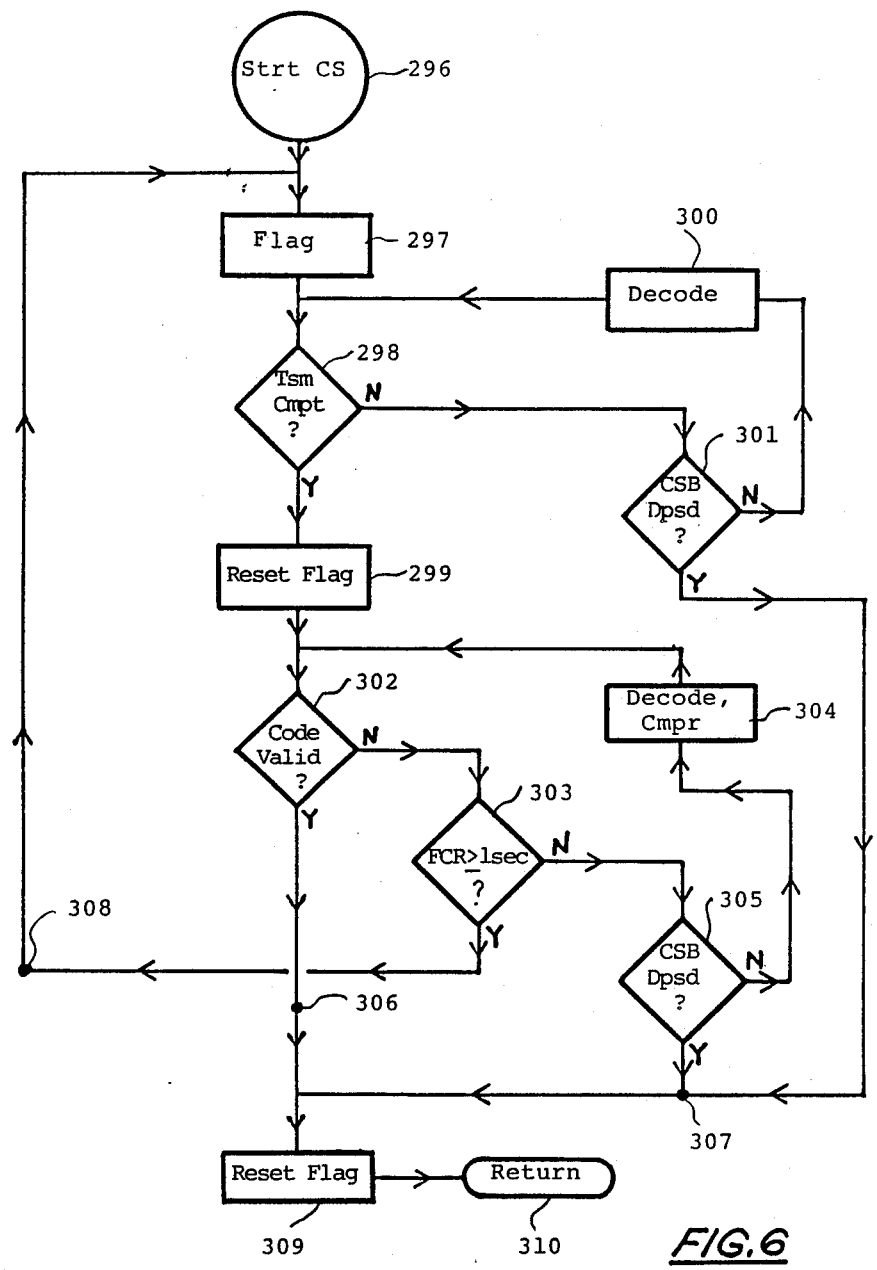
FIG. 6 shows a flow chart of the program subroutine for the code setting function of the door controller according to the invention.

The code setting subroutine is shown in FIG. 6. The subroutine begins by setting a flag indicating code setting is taking place and then tests for the end of a code transmission. If the transmission is complete the "code setting" flag is reset and the subroutine proceeds to a verification loop. If the code transmission is not complete the subroutine enters a code learning loop which tests the state of a code setting button. If the button is not depressed the subroutine decodes and stores a piece of the new code and returns to test for completion of the code transmission. This looping continues until the end of the code transmission or the code setting button is depressed, manually terminating the code setting procedure.

The code verification loop comprises a code validity check which compares the originally learnt code with the new code transmission. If the code is not valid, that is the comparison fails, the subroutine tests the time period which has elapsed since the original code was received. If this period exceeds a predetermined value, in this example, one second, the verification is considered to have failed and the subroutine loops back to its beginning. If the predetermined period has not elapsed and the code setting has not been manually terminated by depression of the code setting button, the subroutine again decodes the input and compares the code for validity. This loop continues until a valid code is verified or the time period for successful verification elapses.

When the code is verified or the coding setting procedure is manually terminated, the "code setting" flag is reset and the subroutine returns to the main program.

Motor Protection

Motors used to drive the doors under discussion are normally required to have high torque and be compact so as to fit within the confines of the door roll. Such motors normally are only rated for intermittent operation and thus must be protected against excessive operation which may result in motor "burn out".

According to a further aspect of the present invention, the door controller provides means to monitor the duty cycle of the driving motor and in response to said means indicating the duty cycle has been exceeded preventing operation of the motor until a predetermined time period has elapsed, said time period being related to the run time of the motor prior to the duty cycle being exceeded.

For example, consider that the motor can only be operated for up to 160 seconds of consecutive cycle from "cold" condition. Once this period has been exceeded the motor is prevented from operating further until a "cooling off" period has been allowed and the motor is considered to have returned to a "cold" condition. In this particular example for each 1 second of running time the motor needs 4 seconds of cooling time. Thus if the motor has run for 160 seconds, a period of 640 seconds is allowed for the motor to reach a "cold" condition before the motor can be reactivated.

In the embodiments of the invention the duty cycle of the motor is monitored by the processor provided in the door controller and the processor inhibits operation of the motor for the desired cooling time. For preference, a visual indication is also given that the motor duty cycle has been exceeded and the motor is inoperable. This indication will cease once the cooling period has elapsed and the motor is reenabled.

Door Locking

The form of drive train usually provided with power operated doors of the type under discussion, has a worm drive having a gear profile which provides self-locking of the door when the motor drive is deactivated.

Such drive trains have been found to be too large and inefficient when using high torque motors and it is desirable to use other means to lock the motor and thus the door. The use of a processor in the door controller of the present invention enables door locking to done by means of a solenoid operated motor lock.

The processor monitors the motor operation and if the motor is off for more than a predetermined time period, for example 2 seconds, the solenoid is engaged. For preference, engagement is done by de-energizing the solenoid. When a command is given for the motor to be started, the solenoid is energized and a small time delay allowed for the solenoid lock to disengage before the motor is activated. A delay is also applied when the motor is reversed in order to avoid damage to the motor control circuitry.

Main Control Program

Figure 2:
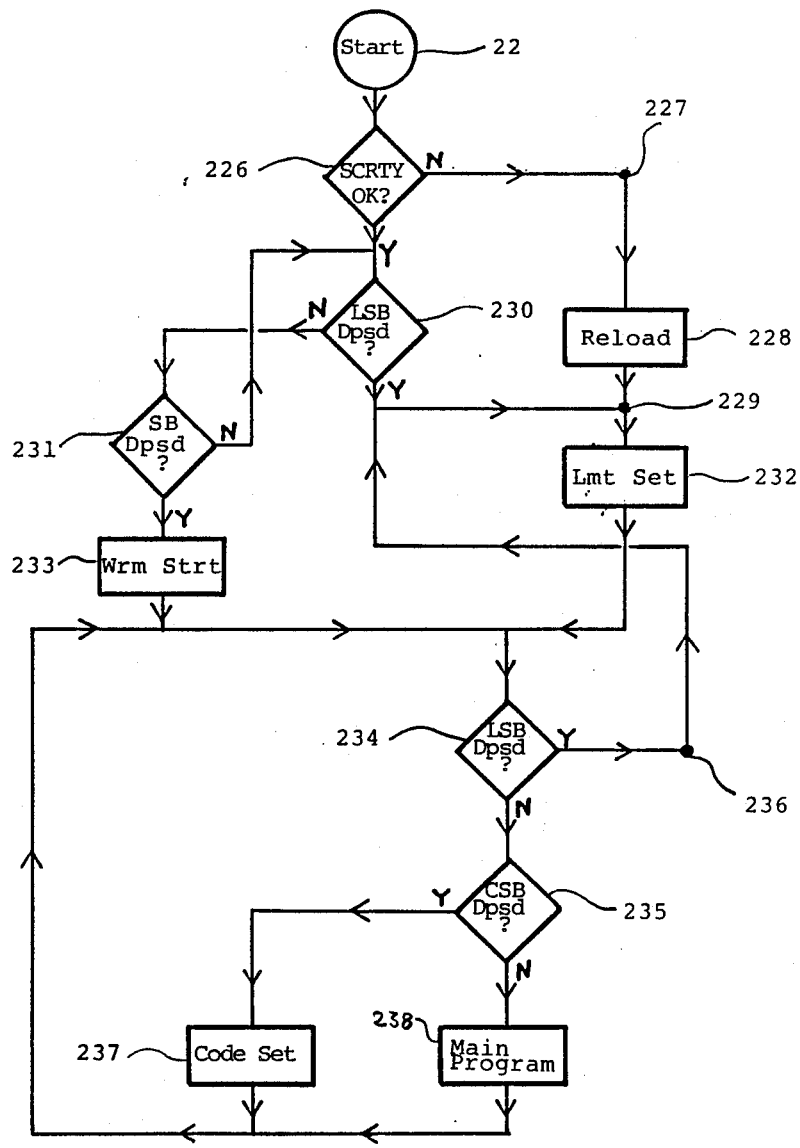
FIG. 2 shows a flow chart of the main control program of the processor used in the door controller according to the invention.
Figure 3:
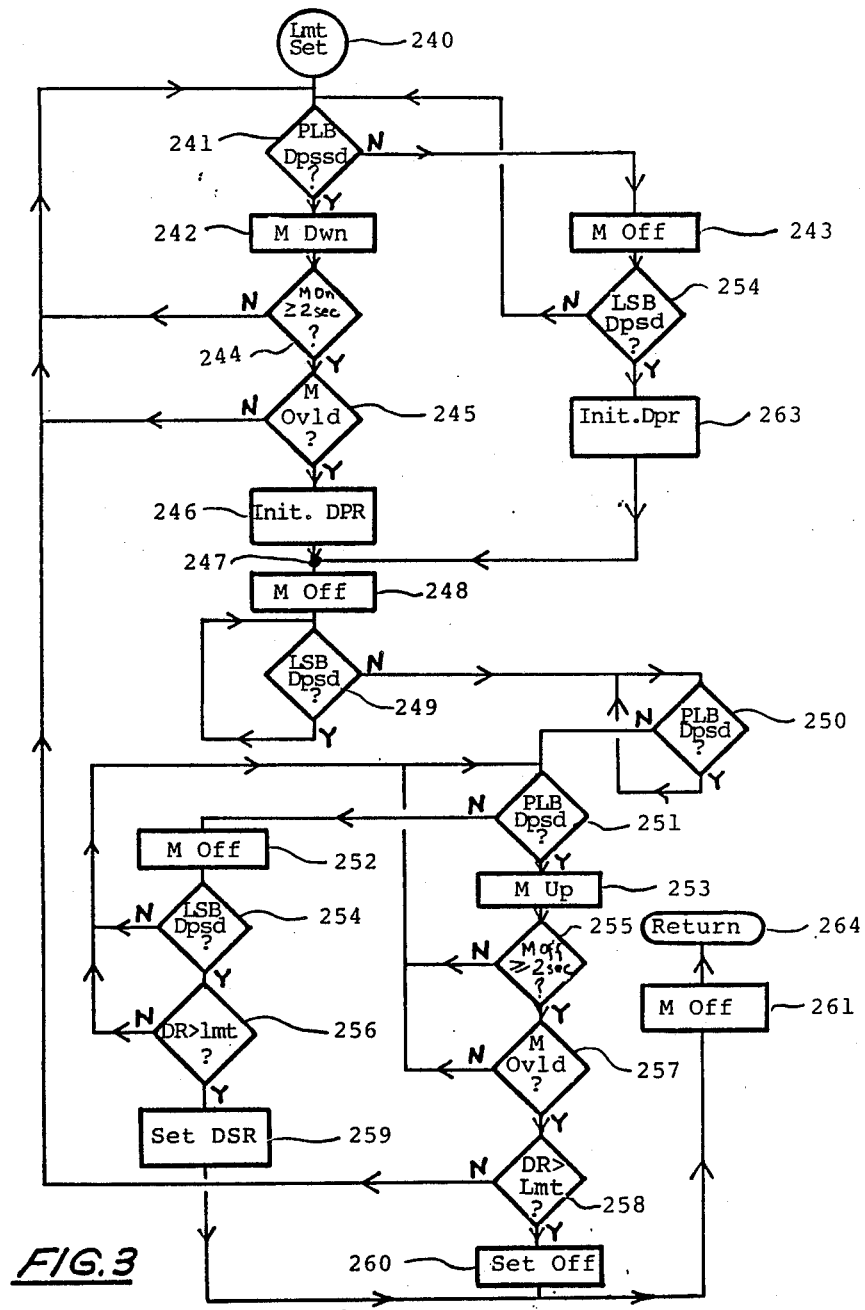
FIG. 3 shows a flow chart of the programs subroutine for the limit setting function of the door controller according to the invention.

The subroutine for providing various functions of the preferred embodiments have been described above. These subroutines are "called" by a main control program, an example of which is shown in FIG. 2.

The program begins by testing whether the data memory security code is intact. If it is not, this indicates data has been lost during a power interruption and the program reloads the data memory security code. It then calls the limit setting subroutine previously described.

If the memory security code is intact the program tests for depression of the limit set button, if this button is depressed it calls the limit setting subroutine. If the limit set button is not depressed the program tests the condition of the start button. If the start button is not depressed the program loops back to test the condition of the limit set button. When the start button is depressed the warm start subroutine is called.

Following completion of the warm start subroutine in the limit setting subroutine the program tests for manual actuation of the limit setting routine by testing the condition of the limit set button. If it is depressed the limit setting subroutine is called. If it is not depressed the program tests whether code setting is required by examining the condition of the code set button. If this button is depressed the code setting subroutine is called. If not the main program is re-entered. On completion of the main program or code setting subroutine the program returns to test for manual situation of limit setting.

Control Circuitry

Figure 7:
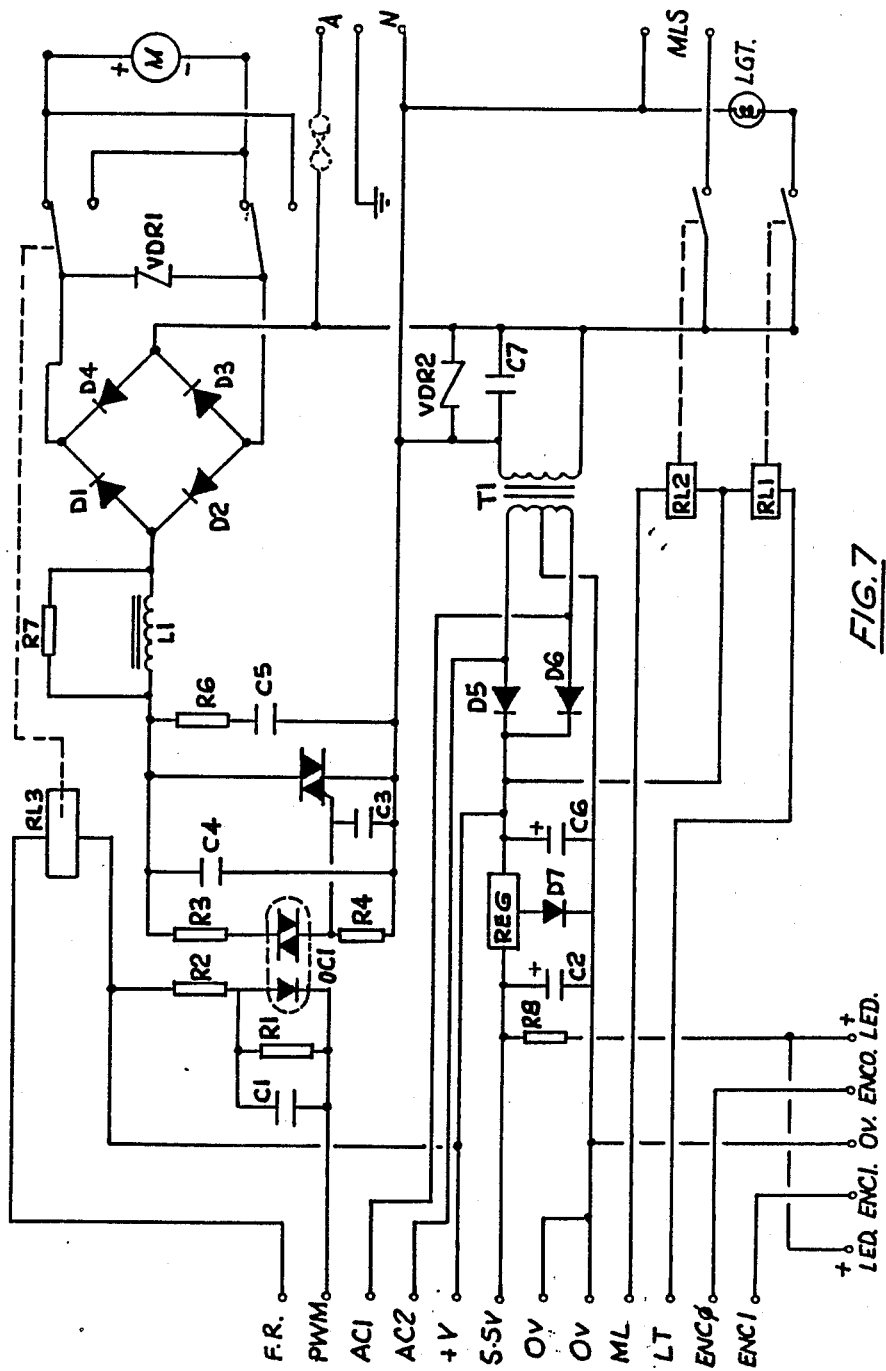
FIG. 7 shows a circuit diagram of the power supply circuit for the door controller according to the invention.

Referring to FIG. 7, the power supply circuitry for the door controller and motor drive is shown.

A 240V A.C. supply is fed to the active and neutral terminals of the circuit marked A and N. This supply is branched, with one branch feeding the motor lock solenoid and door light via relays RL2 and RL1 respectively. A further branch of the A.C. supply is connected to a full wave bridge rectifier constituted by diodes D1–D4. The rectified voltage is fed to the motor via pair of contacts operated by relay RL3. These contacts serve to reverse the polarity of the D.C. voltage applied to the motor and thus the direction of motor drive. A voltage dependent resistor VDR1 is connected in parallel with the output terminals of the bridge rectifier to provide surge and back emf protection.

The voltage input to the bridge circuit is controlled by a variable A.C. control circuit. The circuit comprises a triac switch which switches the A.C. voltage under the control of a optically coupled triac circuit. The switched output is smoothed by means of R-C network R6 and C5 and inductance L1 having a shunt resistor R7. A pulse width modulation signal is fed to the A.C. control circuit via a low pass network comprising R2, C1 and R1. This circuit initiates the triggering of the optically coupled triac which in turn controls the timing of switching of the triac and the A.C. voltage duty ratio supplied to the bridge rectifier.

A further branch of the A.C. voltage supply is fed to transformer T1 which steps the voltage down to 12V which is then connected through a full wave rectifier comprising diodes D5 and D6 to a voltage regulator circuit comprising integrated circuit regulator REG and capacitors C6 and C2 connected to the input and outputs of the regulator respectively. Diode D7 modifies the regulator output to provide desired 5.5V output. The regulated output of 5.5V D.C. is used to power the microprocessor and associated electronic circuitry. A voltage dependent resistor VDR2 is coupled across the primary winding of transformer T1 together with capacitor C7 to provide surge protection.

Figure 8:
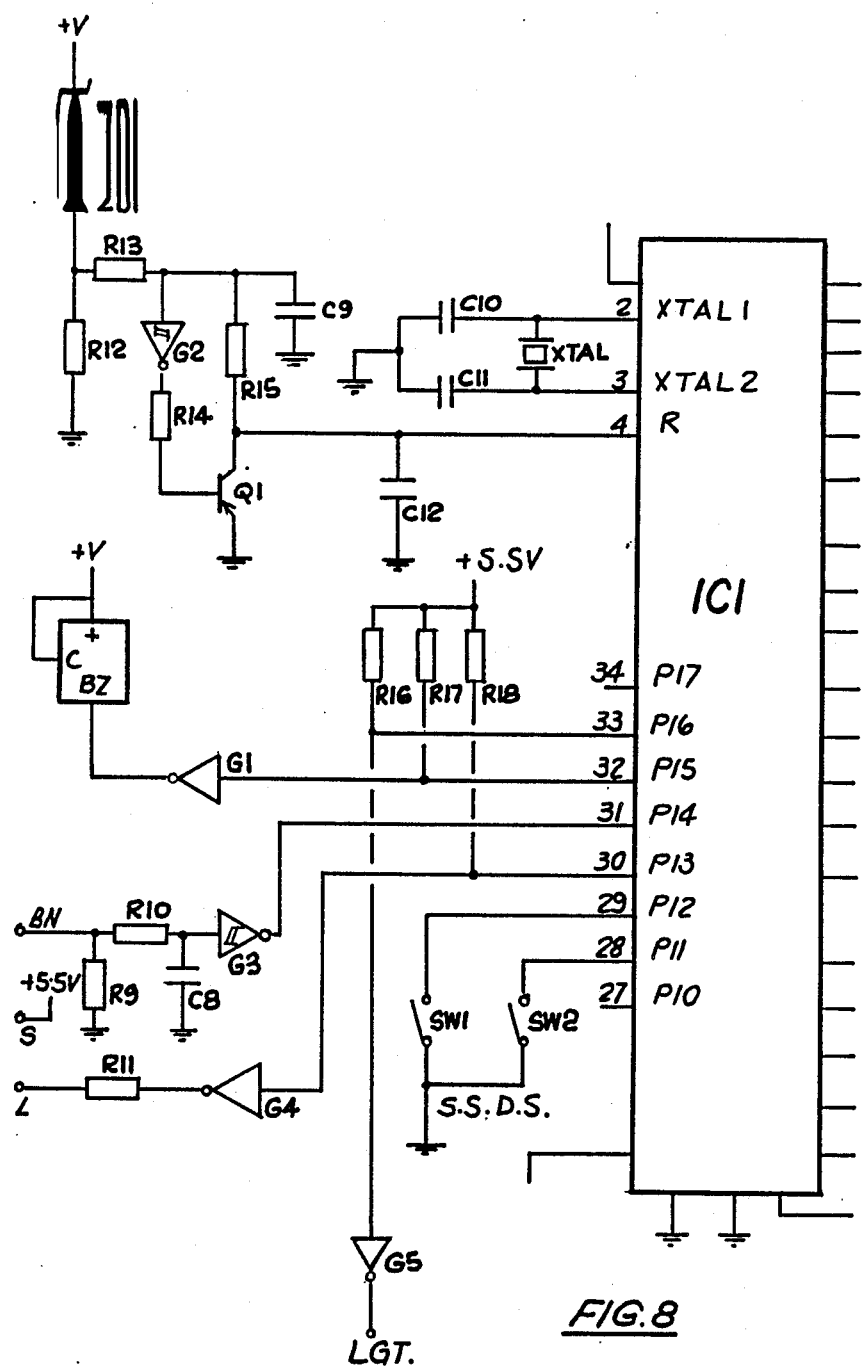
FIGS. 8, 9 and 10 show a circuit diagram of the main control unit for the door controller according to the invention.
Figure 9:
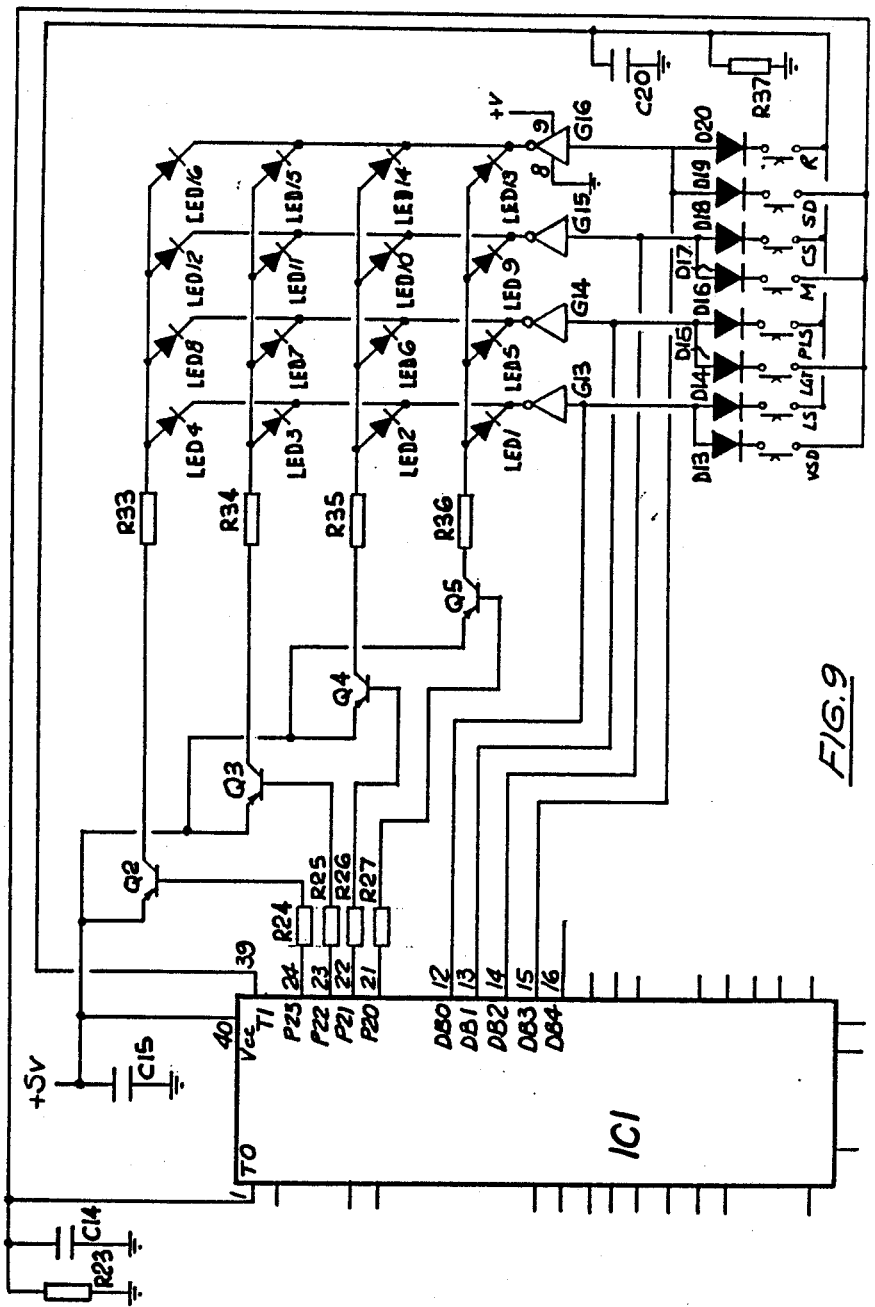
Figure 10:
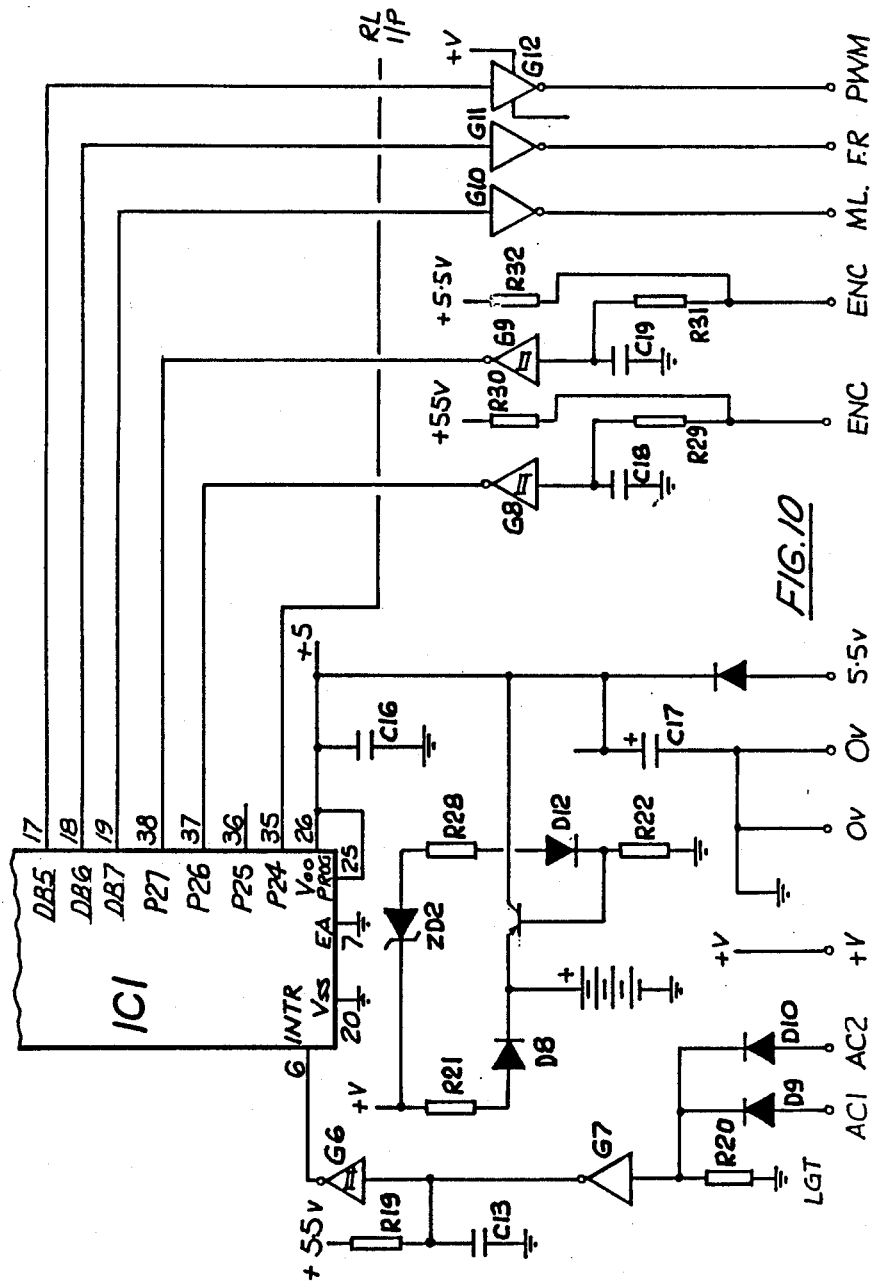

Referring to FIG. 8, the microprocessor circuit and its associated interface and control circuitry is shown. Power supply to the microprocessor is provided in the form of regulated 5.5 volts D.C. This voltage is connected to the VDD terminal of the microprocessor via diode D11. Diode D11 prevents discharge of back-up power supply during power interruption. A smoothing capacitor C17 is connected from the output of the diode to ground.

A backup battery supply is also connected in parallel with the regulated supply to provide power to the microprocessor if the mains power supply fails or is temporarily interrupted. The backup supply in this example comprises 4 nicad cells connected in series however other suitable battery sources may be used. The cells are connected between ground and the emitter of transistor Q6. The collector of transistor Q6 is connected to the VDD terminal and its base is connected between a series connected diode D12 and resistor R22. Diode D12 and resistor R22 from part of a series network comprising zener diode ZD2, resistor R28, diode D12 and resistor R22 connected between the unregulated 12V D.C. supply provided by the half wave rectifier network D5-D6 and ground. This network is arranged to switch the transistor Q6 on and thus supply battery voltage to the processor and associated circuitry when a drop in A.C. power supply voltage is detected. The circuit also provides for charging of the backup battery source during normal A.C. supply. 12V D.C. is fed to the battery source via resistor R21 and blocking diode D8. The blocking diode presents discharge of the battery source through the charging path when the A.C. power supply fails.

The internal timing and clocking of the microprocessor is controlled by a crystal XTAL connected across terminals 2 and 3 of the microprocessor and series capacitors C10 and C11 coupled to ground.

A reset input R is provided to the microprocessor by means of a transistor switch Q1 having its collector coupled to the reset input, its emitter connected to ground and its base driven by a Schmitt trigger gate G2 via a resistor R14. The Schmitt trigger detects the presence of a voltage from the 12V D.C. power supply circuit by means of series connected zener diode ZD1 and resistor R12 connected across said power supply and having their series connection point coupled to the input of the Schmitt trigger G2 via a resistor R13. On receipt of sufficient input voltage the Schmitt trigger switches applying a current to the base of transistor Q1 which in turn switches on taking the reset input 4 of the microprocessor to ground.

Encoder inputs (ENC) from the opto-electronic blade encoder previously described are fed to inputs P26 and P27 via similarly configured interface networks. These networks comprise a Schmitt trigger gate G8 (G9) and lowpass networks comprising a series resistor R29 (R31) and parallel connected capacitor C18 (C19) connected to ground. The encoder input line is biased by resistor R30 (R32) coupled to a regulated D.C. voltage source.

Function indicating LED's, LED 1 -LED 13 are driven by outputs P20-P23 of the microprocessor IC1. The driver lines are connected to the respective base electrodes of transistors Q2-Q5, all of which have their emitters coupled to a source of D.C. voltage. The collectors of each transistor drive one terminal of each of four LED's. These LED's are further scanned by signals provided by scanning lines DB0-DB3 of the microprocessor which connect to the other terminals of each LED via inverting gates G13-G16. The combination of these scanning signals and driver signals can be used to switch on appropriate LED's in the display array so as to indicate particular functions or conditions of the controller.

Scanning lines DB-DB3 are also used to scan inputs for various push button switches SW3-SW10 which are used to control the functions of the microprocessor IC1 and thus the actions of the door controller.

The radio link input is provided directly to input P24 of the microprocessor. Speed control inputs for the motor control are provided by DIP switches SW1 and SW2 which selectively connect inputs P11 and P10 of the microprocessor to ground.

Motor control outputs from the microprocessor are provided by outputs DB5-DB7 which respectively control the motor lock (ML), forward/reverse (F/R) and speed functions (PWM) of the motor. These outputs are coupled to the motor control via interface gates G10-G12.

A light control output (LGT) is provided on microprocessor line P16 via interface gate G5. A buzzer BZ1 for providing audible signals is coupled to output P15 of the microprocessor via interface gate G1.

A remote input (BN) to the microprocessor is provided to input P14 of the microprocessor via a Schmitt trigger gate G3. The input is fed to this gate via a time constant network comprising series connected resistor R10 and parallel connected resistor R9 and capacitor C8. A LED output (L) to the remote switch is provided by output P13 via interface gate G4 and resistor R11.

The A.C. power supply timing is monitored by means of outputs AC1 and AC2 of transformer T1 which are coupled to an interrupt input INTR of the microprocessor circuit IC1. Diodes D9 and D10 rectify the A.C. voltage and gate G7 drives Schmitt trigger G6 via parallel connected R-C network R19 and C13. The output of the Schmitt trigger is connected to interrupt input INTR.

It will be apparent to those skilled in the art that various program arrangements and control circuitry can be used to achieve the functions of the controller required and the invention is not limited to the particular embodiments described or the particular examples given.

It will be further apparent to those skilled in the art that other embodiments of the invention described are possible without departing from the spirit or scope of the invention.

| INDEX TO FLOW CHART DIAGRAMS | |
|---|---|
| BLOCK NO. | CONTENTS |
| 200 | Start of decelerate learning and reversing logic. |
| 201 | Have 16 encoder transitions occurred since last difference calculation? |
| 202 | Sum last 16 encoder periods. |
| 203 | Calculate difference = time sum − old time sum |
| 204 | Old time sum = time sum |
| 205 | Is difference negative |
| 206 | Set difference = zero |
| 207 | Is difference greater than peak difference? |
| 208 | Set peak difference = Difference |
| 209 | Is difference greater than value correspoding to 8% speed change? |
| 210 | Set peak difference = 8% |
| 211 | Is door motoring down? |
| 212 | Has door been motoring down for more than 2 seconds? |
| 213 | Is door curtain within 25 mm of lower limit? |
| 214 | Set peak difference = 1% |
| 215 | Is sector no. greater than old sector no.? |
| 216 | Set old sector no. = Sector no. |
| 217 | Is difference greater than sector sensitivity? |
| 218 | Reverse door |
| 219 | Add 1% to Sector sensitivity. |
| 220 | Is door within 50 mm of lower limit? |
| 221 | Set sector No. = ZERO |
| 222 | Is sector no. = Old sector no.? |
| 223 | Set sector sensitivity = ¾ sector sensitivity + ½ peak difference. |
| 224 | Return. |
| 225 power Up. | Start - Micro computer |
| 226 | Is data memory security code intact. |
| 227 | Data memory contents lost during power down. |
| 228 | Reload data memory security code. |
| 229 | Automatic limit setting activation following loss of memory during extended power down. |
| 230 | Is limit set button depressed? |
| 231 | Is start button depressed? |
| 232 | Limit setting subroutine. |
| 233 | Warm start subroutine. |
| 234 | Is limit set button depressed? |
| 235 | Is code set button depressed? |
| 236 | Manual activation of limit setting. |
| 237 | Code setting subroutine |
| 238 | Main program. |
| 240 | Start of limit setting subroutine. |
| 241 | Is power limit button depressed? |
| 242 | Motor down. |
| 243 | Motor off. |
| 244 | Has motor been on for 2 seconds or more? |
| 245 | Is motor overloaded? |
| 246 | Initialize door position register. |
| 247 | Lower limit set. |
| 248 | Motor off |
| 249 | Is limit set button |

INDEX TO FLOW CHART DIAGRAMS -continued

| BLOCK NO. | CONTENTS |
|---|---|
| | depressed? |
| 250 | Is power limit button depressed? |
| 251 | Is power limit button depressed? |
| 252 | Motor off. |
| 253 | Motor up. |
| 254 | Is limit set button depressed? |
| 255 | Has motor been off for 2 seconds or more? |
| 256 | Is door more than 500 mm above lower limit? |
| 257 | Is motor overloaded? |
| 258 | Is door more than 500 mm above lower limit? |
| 259 | Set door size register (allowing for door overrun) |
| 260 | Set door size register. |
| 261 | Motor off. |
| 262 | Upper limit set. |
| 263 | Initialize door position register (allowing for overrun) |
| 264 | Return. |
| 265 | Start of warm start subroutine. |
| 266 | Motor upwards. |
| 267 | Has 2 seconds elapsed since motor start? |
| 268 | Motor downwards. |
| 269 | Has 2 seconds elapsed since motor start downwards? |
| 270 | Is motor overloaded? |
| 271 | Turn motor off. |
| 272 | Initialize door position register. |
| 273 | Return. |
| 275 | Start of radio control decoding subroutine. |
| 276 | Await transmission start. |
| 277 | Has positive transition occurred on receiver input? |
| 278 | Reset data bit counter. |
| 279 | Transmission started. |
| 280 | Has positive transition occurred on receiver input? |
| 281 | Data bit start selected. |
| 282 | Has more than 7.5 m seconds elapsed since last positive transition? |
| 283 | Has more than 7.5 m seconds elapsed since last positive transition? |
| 284 | Has 20 m seconds elapsed since last positive transition? |
| 285 | Sample receiver input state. |
| 286 | Is code setting flag set? |
| 287 | Compare input state with stored code. |
| 288 | Store current input state in code storage register. |
| 289 | Is transmission complete (is data bit counter = 18)? |
| 290 | Is transmission complete? |
| 291 | Flag "Transmission complete". |
| 292 | Flag "Transmission complete". |
| 293 | Increment data bit counter. |
| 294 | Is received code = stored code? |
| 295 | FLAG "code valid" |
| 296 | Start code setting subroutine. |
| 297 | Set "Code setting" flag. |
| 298 | Is transmission complete? |
| 299 | Reset "Code setting" flag. |
| 300 | Decode and store new code. |
| 301 | Is "Code setting" button depressed? |
| 302 | Is code valid? |
| 303 | Has 1 second elapsed since first code received? |
| 304 | Decode and compare code. |
| 305 | Is "code setting" button depressed? |
| 306 | Code received and verified. |
| 307 | Manual termination of code setting. |
| 308 | Verification failed, await new transmission. |
| 309 | Reset "code setting" flag. |
| 310 | Return. |

We claim:

1. A door controller comprising:
   driving means for driving a door curtain between, open and closed positions of a door opening in response to received door operation command signals;
   door position encoder means for providing signals indicative of the position of said door curtain relative to said door opening;
   timing means for providing timing signals for said controller;
   processing means responsive to said encoder means and said timing means for producing representations of door travel speed characteristics; and
   memory means coupled to said processing means for storing said representations of said door travel speed characteristics;
   wherein, said processing means divides the length of said door opening into a plurality of segments and further sub-divides each of said segments into a plurality of sectors, such that, for each sector, the time for said door curtain to travel a sector is sampled to produce a sampled door travel speed characteristic is compared with a memorized door travel speed characteristic previously stored in said memory means for that sector, an obstruction signal is produced responsive to any difference between said sampled door travel speed characteristics and said memorized door travel speed characteristic exceeding a predetermined value to indicate any obstruction condition, and, provided no obstruction condition is indicated, a running average of said sampled door travel speed characteristic is calculated to provide an updated door travel speed characteristic which is then stored in said memory means as said door travel speed characteristic for that sector.

2. The door controller according to claim 1, wherein said driving means is responsive to the detection of said obstruction condition by said processing means to reverse the direction of travel of said door curtain for a predetermined period of time and then stop travel of said door curtain.

3. The door controller according to claim 1 further comprising a radio receiver, said processing means including code setting means for setting a code specific to said door controller, means for comparing a received signal from said radio receiver and a code signal from said code setting means and means for producing a door operation command signal to operate said door curtain when a comparison is detected by said comparing means between said received signal and said code signal.

4. The door controller according to claim 3 wherein said code setting means is responsive to a coded signal received by said radio receiver from a remote source to set said specific code during a code setting mode.

5. The door controller according to claim 4, wherein said processing means includes code verification means operable to compare a received coded signal with said specific code in said code setting means during said code setting mode such that a comparison indicates a verified code and a non-comparison indicates an invalid set code.

6. The door controller according to claim 1, further comprising:
   closed condition door memory means coupled to said door position encoder for storing signals representative of a desired closed position of the door curtain, and
   open condition door memory means coupled to said door position encoder for storing signals representative of a desired open position of the door curtain,
   said driving means responsive to said signals in said closed condition door memory means and said open condition door memory means to limit door curtain travel to between the positions representative of said signals stored therein.

7. The door controller according to claim 6 further comprising position counter means coupled to said encoder means for storing a count representative of the door curtain position, comparator means for comparing the contents of said position counter means with said stored signals in said closed and open condition door memory means, said comparison indicating whether the door curtain has reached its upper or lower limit position respectively.

8. The door controller according to claim 7 further comprising overload sensing means which senses an overload condition of said driving means.

9. The door controller according to claim 8 wherein said closed and open condition door memory means are coupled to said sensing means and responsive to detection of said overload condition to store a signal from said encoder means representative of the door curtain position at either a fully open overload position or a fully closed overload position.

10. The door controller according to claim 8 further comprising power failure detecting means and control means responsive to a received door command signal following detection of a power failure to cause said driving means to drive said curtain in a predetermined direction for a predetermined period and then reverse said drive direction to drive said curtain to a position where an overload condition is detected, said control means operative to store in said position counter means a count representative of said overload position.

11. The door controller according to claim 10 wherein said predetermined direction is a direction towards an open position of said door curtain.

12. The door controller according to claim 1 further comprising:
   electric motor means for driving the door curtain between open and closed positions in response to received door operation command signals;
   monitor means coupled to said electric motor means for monitoring the duty cycle thereof; and
   processing means coupled to said monitor means and responsive to a signal therefrom indicating that said duty cycle has been exceeded, to inhibit further operation of said electric motor means until a predetermined time period has elapsed, said time period being related to the run time of the electric motor means prior to the duty cycle being exceeded.

13. The door controller according to claim 12 further comprising visual indication means for indicating that the duty cycle has been exceeded and that said motor operation is inhibited, and said indication ceasing once said predetermined time period has elapsed.

14. The door controller according to claim 1 further comprising:
   a motor for driving the door curtain between open and closed positions in response to received door operation command signals;
   locking means operable to lock gear train means and said door curtain in a fixed position; and
   processing means operable to control said locking means in accordance with said received door operation command signals.

15. The door controller according to claim 14 wherein said processing means monitors said motor operation and activates said locking means if said motor is deactivated for a predetermined time period, and deactivates said locking means prior to said motor being activated.

16. The door controller according to claim 1 wherein said predetermined value is increased by a predetermined factor at each detection of an obstruction condition or decreased by a further predetermined factor for each run of the door when no obstruction condition is detected.

* * * * *